United States Patent [19]

Kiefer

[11] 4,252,040
[45] Feb. 24, 1981

[54] METHOD AND APPARATUS FOR FEEDING ROD-LIKE WORKPIECES IN A SEVERING MACHINE

[75] Inventor: Johann M. Kiefer, Sasbach, Fed. Rep. of Germany

[73] Assignee: Keuro Maschinenbau Gesellschaft mit beschränkter Haftung & Co. Kommanditgesellschaft, Achern, Fed. Rep. of Germany

[21] Appl. No.: 18,981

[22] Filed: Mar. 9, 1979

[30] Foreign Application Priority Data

Apr. 15, 1978 [DE] Fed. Rep. of Germany ....... 2816497

[51] Int. Cl.³ .......................... B26D 7/02; B26D 7/06
[52] U.S. Cl. .......................................... 83/42; 83/153; 83/277; 83/282
[58] Field of Search ................... 83/42, 153, 251, 277, 83/282, 409

[56] References Cited

U.S. PATENT DOCUMENTS

| | | | |
|---|---|---|---|
| 3,182,538 | 5/1965 | Whitmore et al. | 83/277 |
| 3,496,811 | 2/1970 | Flanagan et al. | 83/277 |
| 3,707,103 | 12/1972 | Tishken | 83/282 |
| 3,945,282 | 3/1976 | Aizawa | 83/277 |
| 4,080,858 | 3/1978 | Stolzer | 83/277 |
| 4,175,688 | 11/1979 | Scribner | 83/277 |

*Primary Examiner*—Frank T. Yost
*Assistant Examiner*—K. Bradford Adolphson
*Attorney, Agent, or Firm*—Spencer & Kaye

[57] ABSTRACT

A method of advancing rod-shaped workpieces in a feed direction in a severing machine which includes a cutting blade defining a cutting plane, openable and closable clamping jaws and openable and closable feed jaws which are displaceable in the feed direction. The method comprises the following cyclically repetitive steps: displacing the feed jaws against the feed direction from the downstream side of the cutting plane through the cutting plane to the upstream side thereof; grasping a workpiece, situated between the clamping jaws, at a location between the cutting plane and the clamping jaws; opening the clamping jaws for allowing free passage of the workpiece; pulling the workpiece by the feed jaws in the feed direction relative to the clamping jaws through the cutting plane through a distance which corresponds to the workpiece length to be severed. Upon completion of the pulling step the feed jaws are located in their entirety downstream of the cutting plane. Then the clamping jaws are closed and the workpiece is severed in the cutting plane.

6 Claims, 8 Drawing Figures

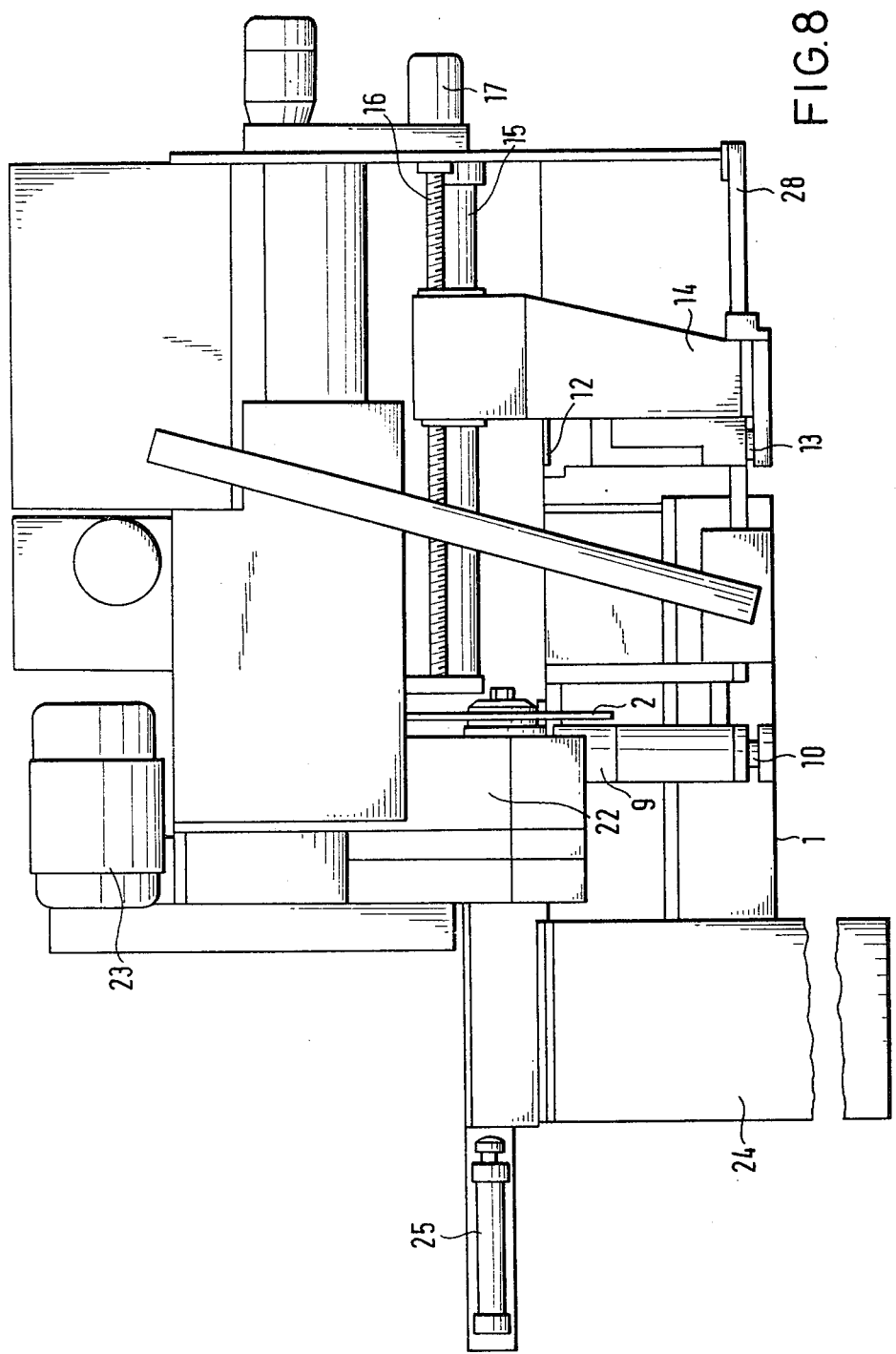

METHOD AND APPARATUS FOR FEEDING ROD-LIKE WORKPIECES IN A SEVERING MACHINE

BACKGROUND OF THE INVENTION

This invention relates to a method for feeding rod-like workpieces in a severing machine, such as a frame saw, a cold circular saw, a band-saw or the like. The material supported on the machine bench of the saw machine stand and on a feed device upstream of the machine bench as viewed in the feed direction, is clamped in the zone of the cutting plane during cutting between at least two clamping jaws which are openable and closable transversely of the feed direction and two feed jaws. The feed between the cutting operations is effected by the feed jaws which are openable and closable transversely of the feed direction and may be displaceable by automatic control along the feed direction. The feed jaws open after the execution of the cut, then grasp the material anew and advance it while the clamping jaws are open. The invention also relates to an apparatus for performing the novel method.

In prior art arrangements the clamping jaws are divided or have an incision in the zone of the cutting plane of the saw blade for grasping the workpiece on both sides of the cutting plane. In this case the workpiece feed is effected by opening the feed jaws arranged on the feed side of the material after the execution of a cut, so that they can travel back a distance by which the workpiece is to be advanced anew. At the same time, the leading end of the workpiece is held by that part of the clamping jaws which is situated on the feed side. There the feed jaws grasp the material again and advance it while the clamping jaws are open. Thereafter the clamping jaws close again, whereupon the next cut begins.

In the above-outlined known rod feed, which in most cases is set in a control device and thereafter works automatically in cycles, one of the problems consists in keeping the residual length of the workpiece remaining after the severing operations as short as possible, in order to prevent excessive material waste. In the known arrangements as explained above, the minimum residual length is determined by that part of the clamping jaws which is situated on the feed side and by a minimum length which suffices for being grasped securely by the feed jaws. In this connection it is a further difficulty that if the residual length is short, upstream of the clamping jaws the workpiece has no longer any secure support.

To reduce the residual length, it is known to provide that part of the clamping jaws which is situated on the feed side, with a recess into which the feed jaws can enter and thus advance more closely to the cutting plane. In this case too, however, the residual length is considerable and is frequently greater than the length to be cut off according to the program. Thus, a waste length is obtained from which at least one more useful length could still have been cut off.

In the prior art structures it is a further difficulty to sort out the residual workpiece length and the initial cut from the next succeeding workpiece from the pieces cut off in accordance with the program. In case of a normal feed, the residual length and the initial cut are situated in the feed path between the normally severed parts, so that special measures are necessary to sort them out.

In addition, when a known severing machine is used, special measures are required to link the machine with afterconnected machines for the further processing of the severed lengths. The latter emerge from the severing machine by being pushed by the upstream-located severed lengths. The severed workpieces are otherwise unguided and thus special guide arrangements have been necessary for the appropriate handling of short and long lengths, on the one hand, and for feeding the severed lengths to further processing stations, on the other hand.

SUMMARY OF THE INVENTION

It is an object to provide an improved method and apparatus of the type outlined above which, while rendering the arrangements more economical, permit extremely short final residual lengths (waste length) and further, the severed lengths can be forwarded without additional devices in a predetermined manner to further processing stations and also, waste lengths and initial cuts are separable from the production flow without additional equipment.

These objects and others to become apparent as the specification progresses, are accomplished by the invention, according to which, briefly stated, the feed jaws, after a workpiece length is cut, grasp the leading end of the residual workpiece on the upstream side of the cutting plane as viewed in the feed direction and then pull the workpiece away from the clamping jaws in the feed direction through and beyond the cutting plane.

By virtue of the above-outlined steps the workpiece is held by the clamping jaws on the upstream side of the cutting plane, while the feed jaws grasping the workpiece at a location upstream of the cutting plane, pull the workpiece forward in the feed direction as the feed jaws move entirely into a position which is downstream of the cutting plane. Thus, very short final residual lengths (waste lengths) are feasible. It is noted that the clamping jaws should be located at such an upstream distance from the cutting plane that the overhanging workpiece length is just sufficient for being grasped by the feed jaws as the latter reach across the cutting plane into the upstream side thereof. After the feed jaws—while pulling the workpiece in the feed direction—have assumed their position downstream of the cutting plane, the clamping jaws on the upstream side of the cutting plane are actuated and thus the workpiece is firmly held for the cutting operation on both sides of the cutting plane. Consequently, clamping jaws provided with an incision and reaching over the cutting plane are no longer needed; this, among others, results in space economy.

In accordance with a further advantageous feature of the invention, after performing the workpiece feed and prior to executing the next severing operation, the feed jaws open, travel against the feed direction up to the downstream side of the cutting plane and then close, whereupon the severing operation is performed. This measure, especially in case of relatively long lengths, is advantageous for reliably grasping and holding the workpiece close to the cutting plane on both the upstream and downstream sides thereof. If, on the other hand, the lengths to be severed are relatively short, it is sufficient only to pull the workpiece from the clamping jaws and, at the same time, to push forward the previously severed length.

In accordance with a further advantageous feature of the invention, the feed jaws, after the cutting operation is completed and before the subsequent feeding operation is commenced, convey the severed length in the feed direction to a predeterminable position. By virtue of the fact that the feed jaws effect the conveyance of the workpiece downstream of the cutting plane, it is feasible to bring the severed lengths, subsequent to the cutting operation, into a position for further processing without additional positioning equipment. Thus, as seen, such a positioning is effected by the feed jaws themselves which, in any event, are indispensable components of the machine. This arrangement further provides the feasibility of severing alternately varying lengths and position them differently by the feed jaws in order to serve, by the severing machine, several further processing machines with an alternating feed.

In the apparatus for performing the method according to the invention the clamping jaws are arranged solely at the upstream side of the cutting plane (as viewed in the feed direction) at a short distance from the cutting plane and further, the feed jaws are arranged at the downstream side of the cutting plane and can travel along a path which is parallel to the feed direction and which starts from a position immediately adjacent the clamping jaws and traverses the cutting plane.

In contradistinction to prior art apparatuses, the clamping jaws which are movable only transversely to the feed direction, are, according to the invention, arranged on the upstream side of the cutting plane rather than on the downstream side of the cutting plane. Similar considerations apply to the feed jaws which, according to the invention, are arranged for displacement transversely to and parallel with the feed direction on the downstream side of the cutting plane. Thus, in contradistinction to the prior art, the feasibility is provided that the feed jaws, in addition to effecting the material feed, also transfer the severed workpiece lengths away from the severing means into a specific position either for the purpose of sorting them from other workpiece lengths or as a preparatory step for further processing. Thus, in addition to the sole task of material feed, the feed jaws, according to the invention, can at the same time perform the additional task of conveying the workpiece length after the severing operation to a specific position for further processing without the need for additional equipment such as guides, sorting devices or the like. This in particular applies for waste lengths and initial cuts which, according to the invention, can be brought by the feed jaws to a suitable position provided for this purpose.

The waste length of the workpiece may be, in contradistinction to prior art apparatuses, extremely short and may even approach zero since, according to the invention, the workpiece is drawn forward by the feed jaws grasping the leading end of the workpiece. While in the prior art apparatuses the waste length of the workpiece is determined by the minimum distance between the clamping jaws and the feed jaws, plus the length required to enable the feed jaws to securely grasp the workpiece, in accordance with the invention the workpiece may be drawn foward by the feed jaws to such an extent that the last workpiece length is not grasped at all by the clamping jaws and is thus merely cut smooth at its trailing end while it is immobilized by the feed jaws.

According to a further feature of the invention, the feed jaws are arranged on a C-shaped frame which bridges over the workpiece transversely to the feed direction and which further is guided for displacement parallel to the feed direction. Thus, the arrangement containing the feed jaws has a downwardly open cross section so that severed workpiece lengths can be brought into a position for further processing by allowing them to fall by gravity. Thus, the guide for the feed jaws as well as a spindle which may be provided for displacing the feed jaws are externally of the zone of soiling by falling dirt parts.

BRIEF DESCRIPTION OF THE DRAWINGS

FIG. 8 is a top plan view of the structure shown in FIG. 6.

DESCRIPTION OF THE PREFERRED EMBODIMENTS

Figure 1:
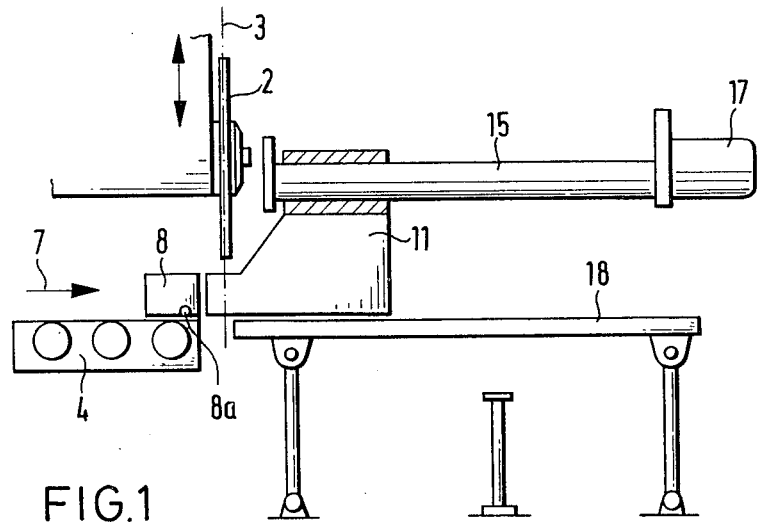
FIGS. 1, 2 and 3 are schematic side elevational views of a cold circular saw depicted in different operational positions for illustrating a preferred embodiment of the method according to the invention.
Figure 2:
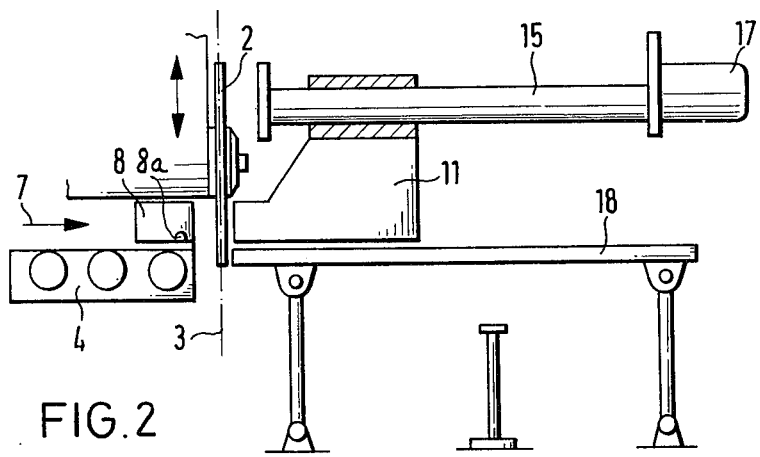
Figure 3:
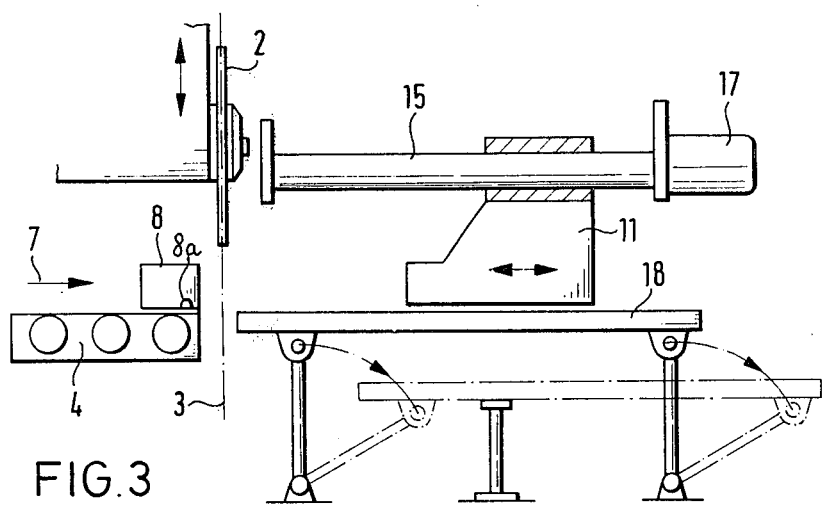
Figure 4:
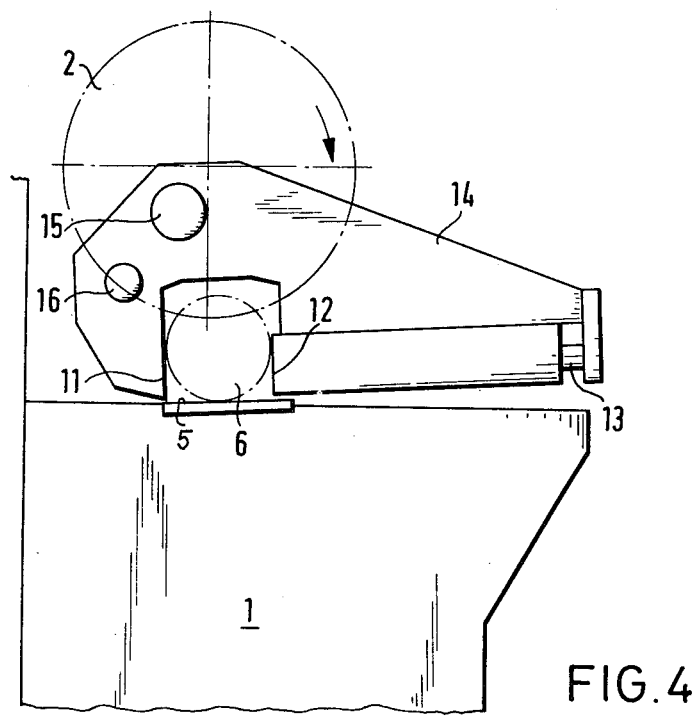
FIG. 4 is an enlarged schematic front elevational view of a detail of FIG. 1.

Turning now to FIGS. 1 through 5, there is shown a machine frame 1 (shown only in FIG. 4) on which there is mounted a saw blade 2 of a cold circular saw, defining a vertical cutting plane 3. The machine frame 1 has a machine bench for the rod-like workpieces 6. The machine bench may be constituted by a roller track 4 as shown in FIGS. 1, 2 and 3 or by a support plate 5 as illustrated in FIG. 4.

The workpiece feed is effected in the direction of the arrow 7 from a position upstream of the cutting plane 3 (as viewed in the direction of feed) into a position downstream of the cutting plane 3.

Upstream of the cutting plane 3 there are arranged clamping jaws 8, 9, of which at least one jaw (jaw 9) is displaceable transversely to the feed direction. For this purpose the jaw 9 constitutes the cylinder of a power cylinder unit, whose piston rod 10 is affixed to the machine frame.

Feed jaws 11, 12 are arranged downstream of the cutting plane 3 and are openable and closable transversely to the feed direction and are also displaceable therealong. The transverse opening and closing movements are effected by the feed jaw 12 which constitutes the cylinder of a power cylinder unit, the piston rod 13 of which is affixed on a C-shaped frame 14. The latter extends upwardly and bridges over the path of the workpiece 6 and, on the other side thereof, forms the feed jaw 11. The shifting movement of the frame 14 in the feed direction is guided by a guide rod 15 and is effected by a threaded spindle 16 which, in turn, is rotated by a motor 17.

In the description which follows, the workpiece feeding and severing operations will be set forth. The starting point of the description is selected to be the moment after a predetermined length has been cut from the workpiece 6 by the circular saw 2.

The workpiece is held clamped by the clamping jaws 8, 9, its leading face lying in the cutting plane 3.

As the first step, the feed jaws 11, 12 are driven, in their open state, against the feed direction 7 to such an extent that they traverse the cutting plane 3 as illustrated in FIG. 1 and then they grasp the workpiece at its leading portion which protrudes between the clamping jaws 8, 9 and the cutting plane 3.

Subsequently, the closed feed jaws 11, 12 travel, together with the workpiece, in the feed direction 7 by a distance which is set in a known manner and which corresponds to the intended workpiece length to be cut. Thus, for example, the feed jaws 11, 12 reach their position shown in FIG. 2. In case of larger lengths to be cut, however, it is feasible to move the feed jaws 11, 12 in a position beyond that shown in FIG. 2 whereupon they are opened and, while the clamping jaws 8, 9 are closed, the feed jaws 11, 12 move back into their position shown in FIG. 2 in which they are again closed. In this manner the workpiece 6 is immobilized during the cutting operation as close to the cutting plane as possible.

Figure 5:
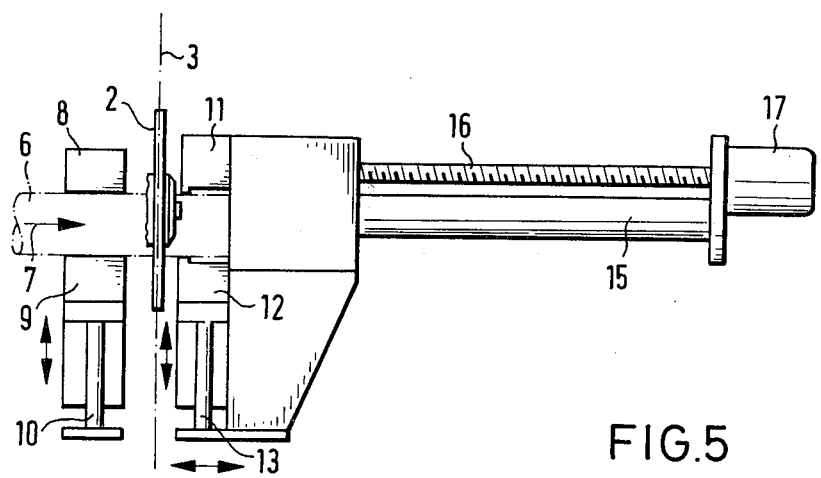
FIG. 5 is a schematic top plan view of the structure illustrated in FIG. 2.

Next, the severing operation is performed. FIGS. 2 and 5 show the moment when the severing operation has been completed. It is noted that for the sake of clarity the workpiece (positioned on the roller track 4) is not shown in FIGS. 1, 2 and 3.

Thereafter the saw blade 2 is withdrawn upwardly from the feed path and the severed workpiece length is moved by the feed jaws 11, 12 into a position as shown, for example, in FIG. 3. Such a position corresponds to the positioning of the severed lengths for further processing which is shown in FIG. 3 in a simplified manner. Thus, for such further processing there is provided a support table 18 which may be lowered as shown in phantom lines in FIG. 3 and then, from this lowered position the workpiece length may be removed, for example, by laterally entering conveying means (not shown). Since the feed jaws 11, 12 are guided by the frame 14 overhead with respect to the workpiece, the feed jaws 11, 12, as they open, allow the severed workpiece length to be discharged downwardly by gravity. It is noted that such an arrangement ensures that no soiling of the guide rod 15 or the threaded spindle 16 will occur, as it was the case in prior art structures.

After removing the severed workpiece length in the manner described above, the feed jaws 11, 12 travel against the feed direction 7 into the position as illustrated in FIG. 1 and grasp the not-yet-severed residual workpiece length at its leading end for displacing the workpiece in the feed direction for the successive severing operation while, at the same time, the table 18 is raised into its solid line position shown in FIG. 3, whereupon a new operational cycle may start.

Turning once again to FIGS. 1, 2 and 3, the severing machine includes a light barrier 8a which signals to the machine control system the presence of a workpiece or, more precisely, the presence of a residual length portion of the workpiece which is being cut into predetermined lengths. As concerns the initial cut from a new workpiece, the workpiece is, in any event, shifted against a non-illustrated stationary abutment from which then, in accordance with the program, there is effected the feed of the workpiece by the feed jaws 11, 12 into a position for the initial cut or directly into a position of the first severing operation.

Figure 6:
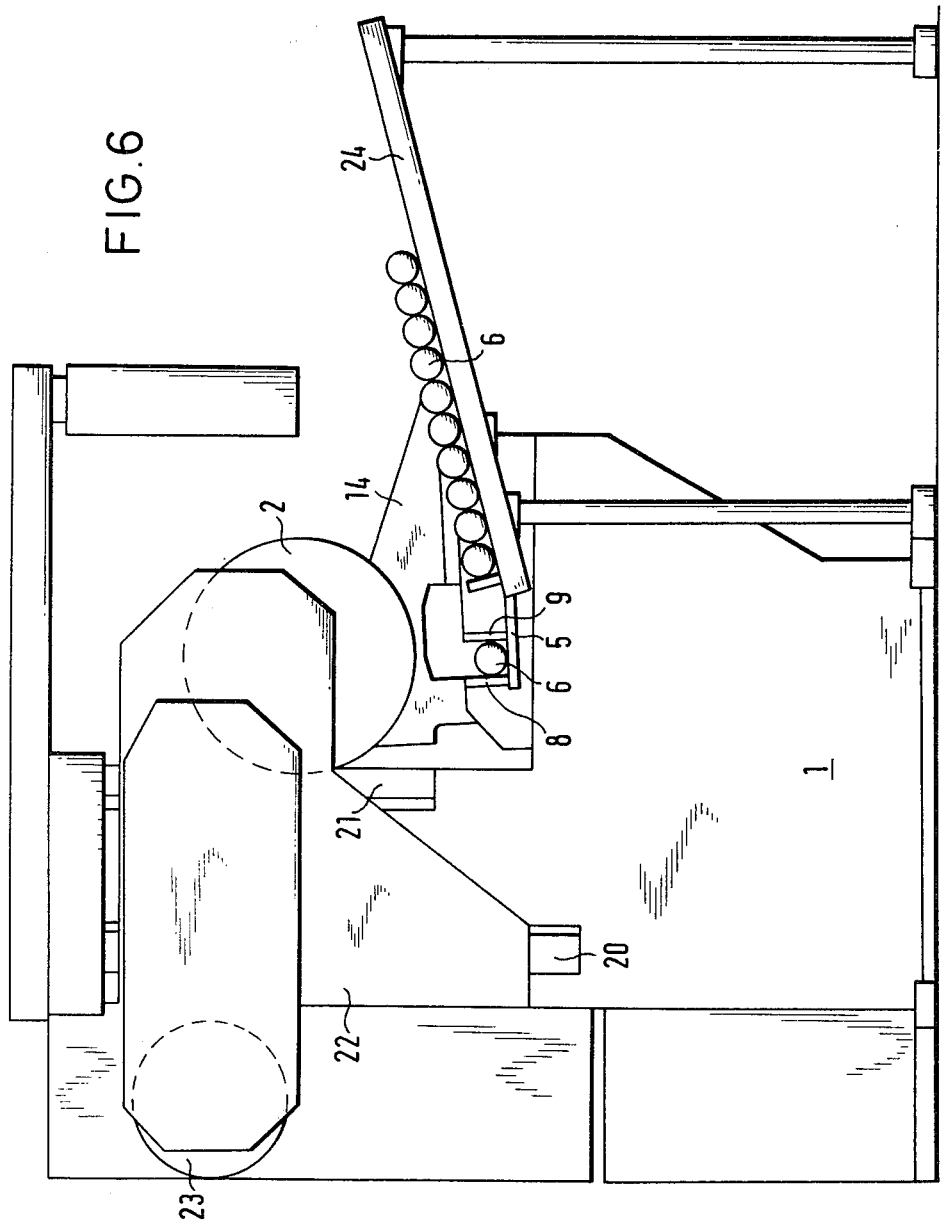
FIG. 6 is a rear elevational view of a cold circular saw according to a preferred embodiment of the invention.
Figure 7:
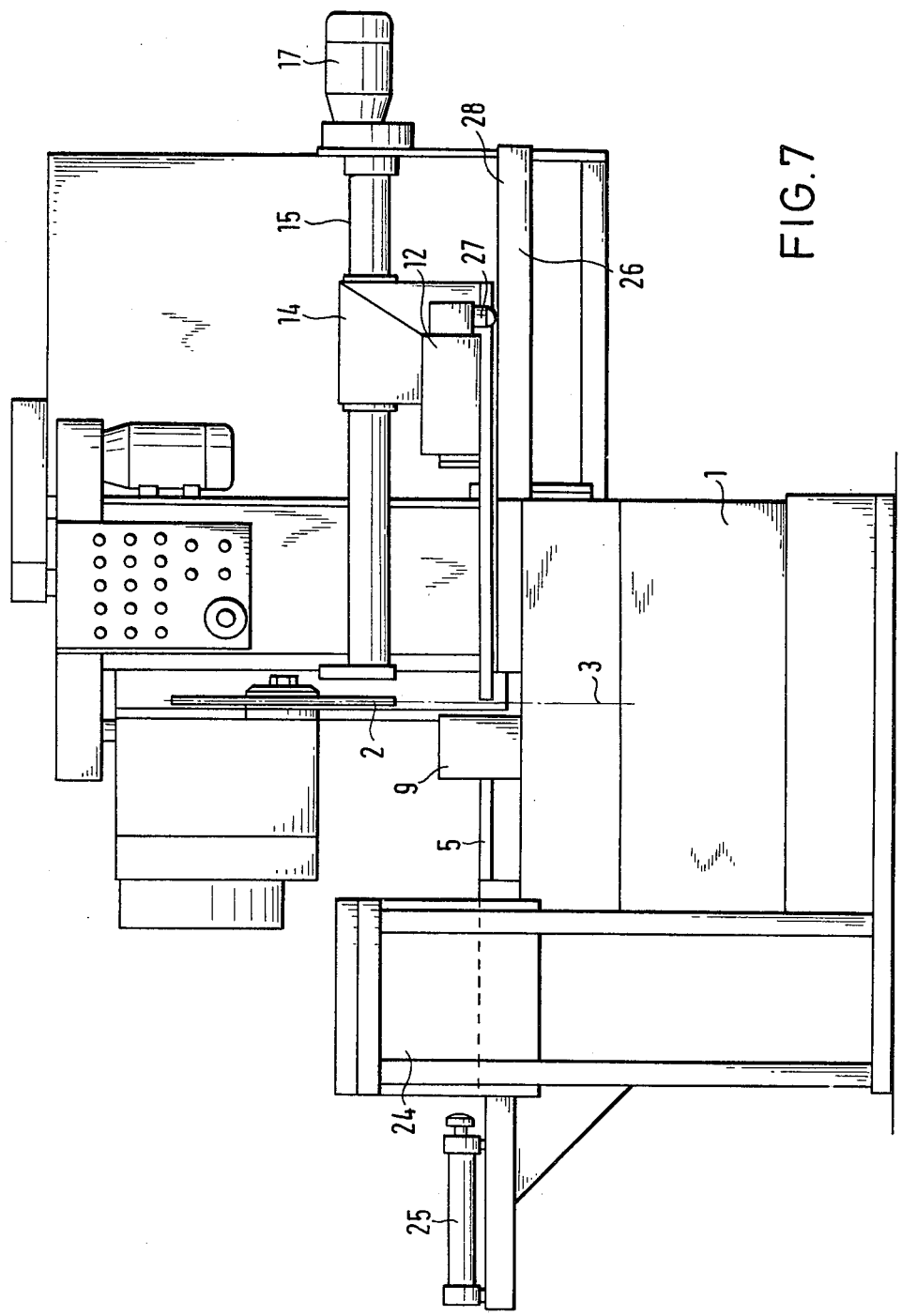
FIG. 7 is a side elevational view of the structure shown in FIG. 6.

Turning now to FIGS. 6, 7 and 8, there is schematically shown in rear elevation, side elevation and top plan view, respectively, a preferred embodiment of an entire severing machine for performing the above-described operational method. The principal components of the machine are identical to those described in connection with FIGS. 1 through 5.

The machine according to FIGS. 6, 7 and 8 has a vertical guide 20, 21 for a carriage 22 on which the saw blade 2 is mounted. The saw blade 2 is rotated by a motor 23. The workpieces are supplied from a magazine constituted by an inclined platform 24 (FIG. 6) from which the workpieces 6 are positioned individually and in sequence by a power cylinder shifter 25 into a position in which they are protruding beyond the clamping jaws 8, 9 in the direction of the cutting plane 3.

After executing each severing operation, the feed jaws 11, 12 convey the severed workpiece length onto a delivery table 26 (FIG. 7).

In order to ensure that the C-shaped frame 14 cannot exert any excessive tilting force on the guide rod 15 and the threaded spindle 16 by virtue of its weight, it is resiliently supported by a roller 27 on a support rail 28. The ensuing resilience permits a slight rocking movement for adapting the feed jaws to any irregularities of the workpiece.

It is to be understood that the above description of the present invention is susceptible to various modifications, changes and adaptations, and the same are intended to be comprehended within the meaning and range of equivalents of the appended claims.

What is claimed is:

1. In a method of advancing rod-shaped workpieces in a feed direction in a severing machine including a cutting blade defining a cutting plane having an upstream side and a downstream side; clamping jaws openable and closable transversely to the feed direction; feed jaws openable and closable transversely to the feed direction and displaceable therealong towards and away from the clamping jaws; the improvement comprising the following cyclically repetitive steps:
    (a) displacing the feed jaws against the feed direction from the downstream side of said cutting plane through said cutting plane to the upstream side thereof;
    (b) grasping a workpiece, situated between the clamping jaws, at a location between said cutting plane and said clamping jaws;
    (c) opening the clamping jaws for allowing free passage of the workpiece;
    (d) subsequent to steps (a), (b) and (c), pulling the workpiece by said feed jaws in said feed direction relative to said clamping jaws through said cutting plane through a distance which corresponds to the workpiece length to be severed; upon completion of said pulling step said feed jaws being located in their entirety downstream of said cutting plane;
    (e) closing said clamping jaws;
    (f) subsequent to step (d), opening said feed jaws and displacing said feed jaws against said feed direction up to a location immediately adjacent said cutting plane at said downstream side thereof;
    (g) subsequent to step (f), closing said feed jaws for grasping the workpiece by said feed jaws at said location immediately adjacent said cutting plane at said downstream side thereof; and
    (h) subsequent to steps (e) and (g), severing the workpiece by the cutting blade along said cutting plane.

2. A method as defined in claim 1, further comprising, subsequent to said severing step and prior to the pulling step of the consecutive operational cycle, the step of displacing by said feed jaws the workpiece length cut during said severing step, in the feed direction to a predetermined location.

3. In a severing machine for cutting rod-like workpieces into predetermined lengths, including a support surface defining a workpiece path along which the workpieces are advanced in a feed direction; a cutting blade defining a cutting plane traversing the workpiece path; the cutting plane having an upstream side and a downstream side with respect to the feed direction; clamping jaws arranged in the workpiece path and openable and closable transversely to the feed direction; feed jaws arranged in the workpiece path and openable and closable transversely to the feed direction; means for displacing the feed jaws towards and away from the clamping jaws parallel to the feed direction; the improvement wherein said clamping jaws are located solely upstream of said cutting plane; the improvement further comprising means for supporting said feed jaws for displacement thereof along a feed jaw path extending from a location downstream of said cutting plane to a location upstream of said cutting plane immediately adjacent said clamping jaws, whereby said feed jaws are displaceable from the downstream side of said cutting plane to the upstream side thereof for grasping a leading part of the workpiece and pulling it in the feed direction by said feed jaws relative to said clamping jaws to a predetermined extent; said means for displacing said feed jaws further including means for moving said feed jaws against said feeding direction to a downstream location immediately adjacent said cutting plane to provide for grasping the workpiece during the severing operation by said feed jaws at said downstream location immediately adjacent said cutting plane.

4. A severing machine as defined in claim 3, wherein said clamping jaws are located at a short distance from said cutting plane.

5. A severing machine as defined in claim 3, wherein said feed jaws are comprised in a C-shaped frame bridging over said workpiece path transversely to said feed direction; said C-shaped frame being connected to said means for displacing said feed jaws.

6. A severing machine as defined in claim 6, wherein said means for displacing said feed jaws comprises a guide rod stationarily supported parallel to said feed direction and passing through said C-shaped frame for guiding the same; a threaded spindle supported parallel to said guide rod and threadedly engaging said C-shaped frame; and drive means for rotating said threaded spindle to displace said C-shaped frame along said feed jaw path.

* * * * *